United States Patent

[11] 3,623,608

| [72] | Inventor | Logan C. Waterman<br>Houston, Tex. |
|---|---|---|
| [21] | Appl. No. | 12,916 |
| [22] | Filed | Feb. 20, 1970 |
| [45] | Patented | Nov. 30, 1971 |
| [73] | Assignee | Petrolite Corporation<br>St. Louis, Mo.<br>Original application Oct. 31, 1968, Ser. No. 772,081. Divided and this application Feb. 20, 1970, Ser. No. 12,916 |

[54] WATER CLARIFIER AND SEPARATOR
18 Claims, 3 Drawing Figs.

[52] U.S. Cl. ............................................. 210/221,
210/525, 210/539
[51] Int. Cl. ............................................. C02c 1/30

[50] Field of Search.. ........... ........... 210/44, 220, 221, 525, 537–540

[56] References Cited
UNITED STATES PATENTS
2,324,400  7/1943  Kelly et al.  ............  210/44

*Primary Examiner*—J. L. DeCesare
*Attorney*—Harris, Kiech, Russell & Kern

ABSTRACT: A clarifier for oil-contaminated water from a desalter or other source, the water being clarified by gas flotation effected in a closed vessel having an upper-inclined wall guiding the oily waste material to a collection zone of the vessel without the use of mechanical surface skimmers. The flotation is usually effected at a pressure other than atmospheric. The oily waste material and the separated gas may be further treated for recovery of valuable products, as by being returned to the desalter or to refinery equipment.

INVENTOR
LOGAN C. WATERMAN
BY HIS ATTORNEYS
HARRIS, KIECH, RUSSELL & KERN

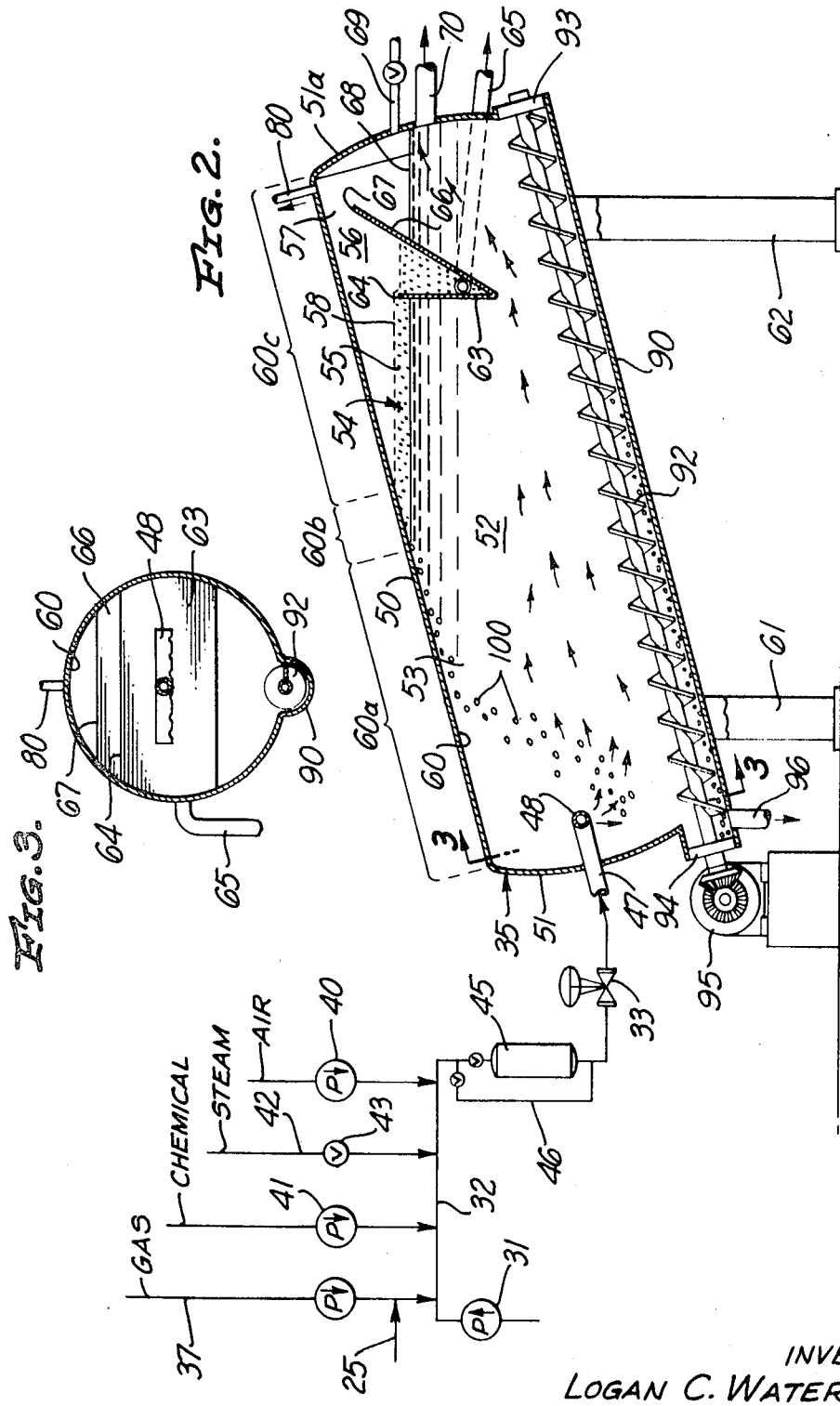

WATER CLARIFIER AND SEPARATOR

This application is a division of copending application Ser. No. 772,081 filed Oct. 31, 1968.

A desalter, more specifically defined hereinafter, is commonly used in the electric or nonelectric treatment of crude oil streams to remove water, salts, solids or other contaminants of the oil preparatory to oil-refining steps. The effluents of the desalter are, first, a treated oil and, second, a separated aqueous material. The latter is hereinafter referred to merely as water or as a water bleed for simplicity. This aqueous materials is largely water but contains the salts, solids or oil contaminants desirably removed by the process. Unfortunately the water is often contaminated by oil even when using the most effective dehydrating, desalting or treating steps that precede or lead to the oil-water separation. Such a contaminated water whether produced by a desalter or whether it is a similar aqueous material produced by or present in some other source is herein referred to as an oil-contaminated water.

Such an oil-contaminated water represents a severe disposal problem, not to mention the oil losses occasioned if the oil is not recovered. The contaminated water can usually not be run into a sewer, lake or stream and is often delivered to storage ponds or tanks with the hope of some gravitational separation or some concentration through evaporation of the water. The result is a sludgelike mass which, while reduced in volume, still presents the same or even more severe disposal problems. In addition, hydrocarbon vapors separating during such storage in ponds or tanks are air pollutants and contribute to smog or atmospheric contamination.

It is an object of the invention to provide a clarifier closed from the atmosphere in which oil-contaminated water can be treated to separate the oil from the water. A further object is to introduce gas into such a closed clarifier to aid in flotation of the oil particles from a water body, forming a layer of oily waste material above the now-clarified water.

It has previously been proposed to dissolve air in water under high pressure and then suddenly release the pressure to release the gas from solution and form small dispersed bubbles or particles of air that sweep upward through a body of oil-contaminated water to sweep dispersed oil droplets therefrom. These droplets are carried to the surface of the body and are swept by a mechanical skimmer to a discharge position. The top of the vessel is usually open to the atmosphere to expose the mechanical skimming equipment. It is an object of the invention to eliminate the need for such a mechanical skimmer and to effect a gas flotation type separation out of contact with the atmosphere and often at a negative or positive gauge pressure. In this connection it is an object of the invention to effect such separation in a closed horizontally elongated vessel that is inclined or has an upper inclined wall. The shape and attitude of the top of the vessel provide for gathering the oily waste material in one end or one portion of the vessel at the top thereof, all without the use of mechanical skimmers. It is a further object of the invention to flow the thus-gathered oily waste material over a weir preparatory to removal thereof from the vessel.

The oil-contaminated waters with which this invention is concerned will sometimes carry dispersed particles of solids or other materials that are too heavy to be carried upward by the gas particles to the oily waste zone. Such heavier particles tend to separate to the bottom of the closed vessel as a sludge. It is an object of the invention to provide for continuous or intermittent removal of such sludge from the clarifier vessel.

In some embodiments of the invention it is an object to treat further the oily waste material that is formed, with the objective of separating it into valuable constituents. In this connection it is an object of the invention to clarify oil-contaminated water as above and to return the resulting oily waste material to the same or some other desalter, treater or separator for further treatment to recover valuable products therefrom.

In one preferred practice of the invention it is an object to associate the clarifier of the invention with a refinery system in which a crude oil is first desalted to produce a desalted oil and an oil-contaminated water with the latter flowing to the clarifier where separation is assisted by gas from the refinery system. With such an arrangement it is an object to return to the refinery system at least a portion of the gas withdrawn from the clarifier; also to return to the refinery system at least a portion of the oily waste material effluent of the clarifier to recover valuable products therefrom.

Further objects and advantages of the invention will be evident to those skilled in the art from the following description of an exemplary embodiment.

Referring to the drawings,

FIG. 1 exemplifies the invention as applied to a refinery receiving crude oil from a desalter.

FIG. 2 is a vertical sectional view of the clarifier and suggests other uses thereof.

FIG. 3 is a transverse sectional view taken along the line 3—3 of FIG. 2.

Figure 1:
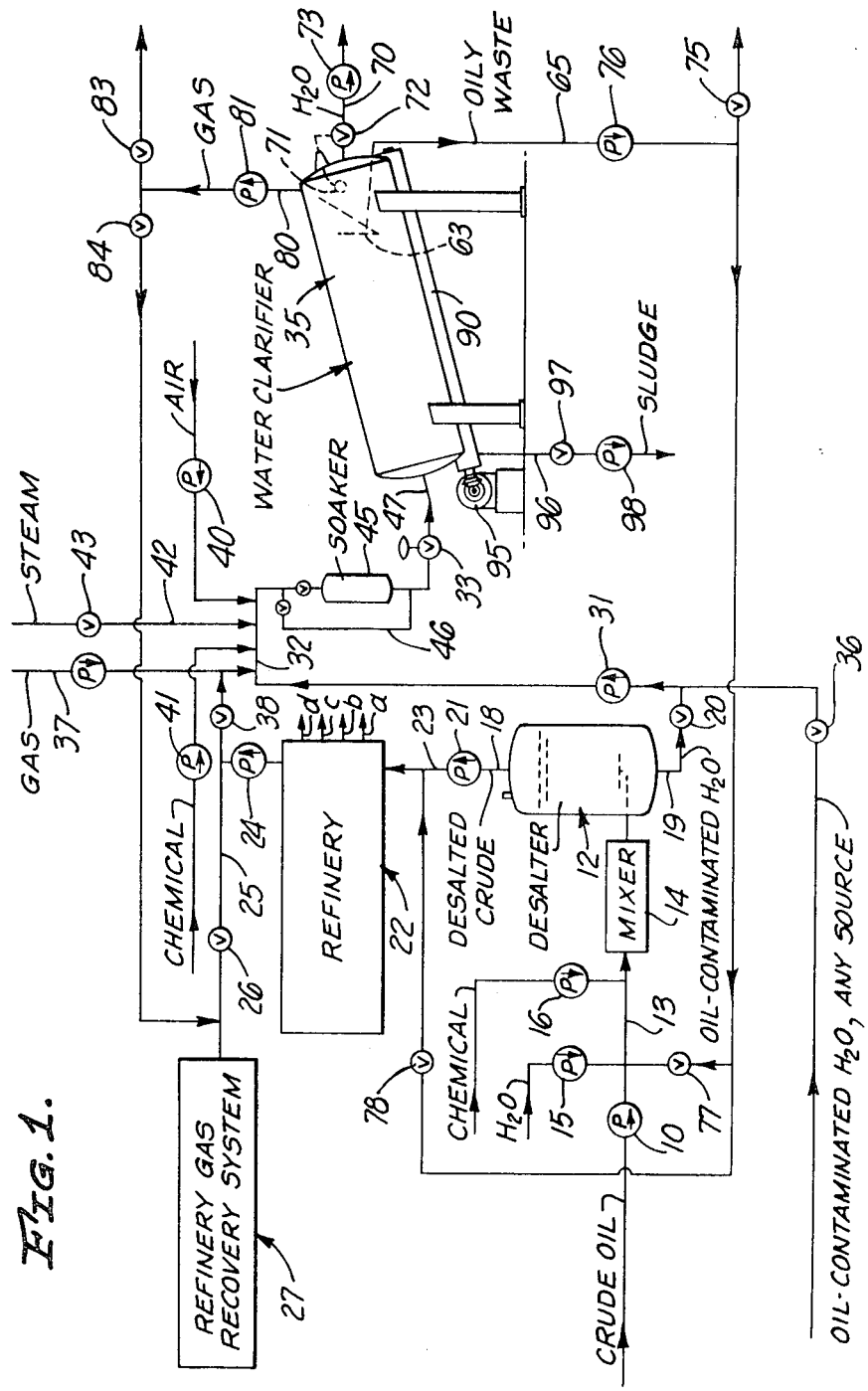

In the preceding and following portions of the specification reference to crude oil is intended to mean those oil-continuous emulsions, produced from wells or other sources, carrying dispersed aqueous droplets some or all of which are desirably removed before the oil is subjected to refining steps that involve distillation, thermal or catalytic cracking, molecular modification or other treatment producing marketable products from the oil, such refining steps being carried out in suitable refinery equipment of known types. The oil or the aqueous phase of such an emulsion often carries materials dissolved or dispersed therein that are desirably removed prior to such refining steps. Such materials often corrode, form deposits in or otherwise detrimentally affect the refinery equipment or the refining operations carried out therein. Salts dissolved in the dispersed water are the most common offender as concerns crude oils that are sometimes referred to as salty oils.

The salts or other materials in such oils can be reduced or removed by a simple dehydration step that reduces the aqueous content of the oil. Alternatively, the oil in its original or dehydrated form can be subjected to a desalting step in which a relatively fresh water is mixed with the oil and the resulting emulsion treated to separate its component phases. For simplicity and as applied to crude oils, the invention will be described with reference to a desalter with such term having reference to dehydration and/or desalting equipment of known character in which phase separation is facilitated by coalescing aids such as heat, pressure, passage through intersticial beds or materials, subjection to electric fields or centrifugal action, etc., all with or without the use of chemicals aiding the coalescing or separating actions.

Oil-contaminated water, as the term is herein used, has reference to the heavier or aqueous phase bled from a desalter; also to similar water-continuous systems encountered in waste ponds, streams, settling vessels or other sources of water that carry oil droplets in objectionable amounts. The oil-contaminated waters with which the invention is concerned are water-continuous dispersions containing dispersed oil droplets that will not readily separate therefrom. The amount of the dispersed oil may range from a few parts per million up to 25 percent or sometimes as high as 50 percent by volume.

Words such as gas or waste gas are herein used in a broad sense to include fixed gases or vapors or mixtures thereof. The invention will be specifically exemplified as applied to refinery operations and as utilizing waste gases therefrom.

As exemplified in FIG. 1, a salty crude oil of relatively low water content is pressured by a pump 10 and delivered to a treater, exemplified as a desalter 12, through a pipe 13 that may incorporate a mixer 14 of any suitable type. If desired, water may be delivered to the pipe 13 by a pump 15. A demulsifying chemical may likewise be delivered to the pipe 13 by a pump 16, all as well known in the art of dehydrating and/or desalting crude oils. The desalter 12 separates the mixture into a desalted crude oil, exiting through a pipe 18, and an oil-contaminated water that is bled from the desalter through a pipe 19 equipped with a valve 20.

Following known practices, the desalted oil is pressured by a pump 21 and enters the refinery equipment 22 through a pipe 23. Various petroleum fractions or products are produced in the refinery equipment 22 and are removed therefrom through product lines a, b, c, d, etc., all with the production of a waste gas. Such gas, usually along with waste gases from other equipment, is pumped by a pump 24 through a pipe 25 and a valve 26 to a refinery gas recovery system 27 for recovery of valuable components from the gas.

Oil-contaminated water withdrawn from the bottom of the desalter 12 through the valve 20 enters a pump 31 for delivery through a pipe 32 and a pressure reduction valve 33 to the clarifier of the invention, indicated generally by the numeral 35. Alternatively or in addition, an oil-contaminated water from any other source may be delivered to the pump 31 through a valve 36 for treatment and separation in the clarifier 35.

As will later be described in more detail, it is desirable that the oil-contaminated water should have dispersed gas therein at the time of release into the clarifier 35. Some or all of this gas may be present in dissolved form in the oil-contaminated water from the desalter 12 if the latter is operating under significant superatmospheric pressure. At least a portion of this dissolved gas is converted to gas in a dispersed state upon pressure reduction in the valve 33. Usually however the invention operates best when such gas is augmented by supplementary gas from other sources. In this connection gas from any source 37 may be pressured by a pump if necessary and introduced into the pipe 32. It is often desirable to use $CO_2$ as such a gas in view of the high solubility thereof in water, but any fixed or stable gas can be used. In many instances the supplementary gas may desirably be a refinery gas. For example a portion of the gas pressured by the pump 24 and flow-controlled by a valve 38 can be forced into the pipe 32 to mingle with the oil-contaminated water therein. Likewise atmospheric air may be pressured by a pump 40 and delivered to the pipe 32 as a substitute for or in addition to the gas supply from the sources 27 or 37. Some or all of any such supplementary gas delivered under pressure to the pipe 32 may dissolve in the liquids therein at the existing pressure but usually some of the supplementary gas will exist in entrained state beyond the point of its introduction.

A small amount of a chemical agent can be metered into the pipe 32 through a pump 41. Chemicals acting to destabilize the oil droplets dispersed in the water or that will facilitate phase separation by gravity are well known in the art. Likewise steam may be introduced into the pipe 32 through a steam line 42 as controlled by a valve 43. Such steam may be used to heat the oil-contaminated water advancing to the clarifier 35 or destabilize the dispersed oil droplets therein. The condensate will join the aqueous phase of the advancing stream.

The steam or supplementary gas supplied to the pipe 32 under pressure will readily mingle with the oil-contaminated water therein as a result of turbulence in the pipe 32 resulting from flow therein. No special mixing device is required but such can be incorporated in the pipe 32 if desired. However it is often desirable to subject the oil-contaminated water and its dissolved or entrained gas to a soaking period before the stream enters the clarifier 35. For this purpose a soaker 45 can be interposed in the pipe 32 and may represent a pressure-type vessel, usually upright, providing a residence time of about 1—5 minutes or so. If a soaking period is not desired the soaker 45 may be bypassed by the line 46 and the valving shown.

FIG. 2 illustrates the preferred clarifier 35 in conjunction with a simplified showing of the ancillary equipment supplying thereto the oil-contaminated water with its original or augmented gas content. As the stream passes through the valve 33 its pressure is significantly reduced and much or all of the dissolved gas is liberated in a pipe 47 that extends into the clarifier and terminates in some type of spreader or distributor 48, shown as a perforated cross pipe with downwardly facing openings.

The clarifier 35 provides a closed or pressure-type vessel 50, preferably a cylindrical vessel having a cylindrical wall closed respectively by heads 51 and 51a at the entrance and exit ends of the vessel. The interior of the vessel 50 forms a separating chamber made up of a water zone 52 containing a body of water 53, an oily waste zone 54 thereabove containing a layer of an oily waste material 55 accumulating as a result of the process, and a gas zone 56 above the oily waste zone with a body of gas 57 therein, the gas contacting the oily waste material 55 along an approximately horizontal interface 58.

The vessel 50 should provide an upper inclined wall 60 closing and bounding at least that portion of the length of the separating chamber that is above the water zone 52 and in contact with the water therein. The function of the inclined wall 60 above the water zone is, first, to receive oil droplets carried upward thereto by gas particles rising through the water body 53, second, to guide such droplets and gas particles to the oily waste zone 54 and, third, to deliver the droplets and gas particles to such portion of the oily waste zone as to cause flow of the oily waste material therein toward a discharge position. Most conveniently and economically the upper inclined wall 60 is the upper interior wall of the vessel 50 with the latter being mounted on foundation supports 61, 62 of different height so that the vessel is inclined with its central axis rising from its entrance end to its exit end. The inclined wall 60 thus formed will bound and close the upper ends of each of the zones 52, 54 and 56, the wall providing a first section 60a contacting the water in the water zone 52, a second section 60b forming the upper boundary of the oily waste zone 54, and a third section 60c forming the upper boundary of the gas zone 56. With such an arrangement the interface 58 will be nonparallel to the central axis of the vessel and the gas zone 56 will be generally triangular in vertical section and positioned in the upper interior of the vessel adjacent its discharge end.

To remove oily waste material from the vessel 50 the invention provides a trough 63 in the separating chamber extending transversely thereacross. This trough includes a forward member terminating in an upper edge 64 forming a weir over which the oily waste material flows into the trough to be removed therefrom by a pipe 65. The trough 63 provides also a rear member with its upper end providing a baffle 66 extending into the gas zone 56 with its upper edge 67 at an elevation above the edge 64. There will be a horizontal gas-water interface 68 between the baffle 66 and the head 51a. If because of malfunctioning or accumulation of an unduly deep layer of the oily waste material in the zone 54 the interface 58 rises to the upper edge 67 the excess oily waste material can flow over this edge and accumulate as a layer above the interface 68. Should this occur the material in such layer can be withdrawn through a pipe 69.

Separated water, now substantially free of dispersed oil, can be withdrawn from the body of water 52 through a pipe 70 opening just below the interface 68. As suggested in FIG. 1 the interface 68 can be maintained at a constant level by a level control float 71 operatively connected to a valve 72 in the pipe 70 controlling this valve in a way to maintain the interface 68 at a constant level. In instances where a subatmospheric pressure is maintained in the vessel 50 flow of the clarified water through the pipe 70 is induced by a pump 73, see FIG. 1.

The oily waste material exiting through the pipe 65 may be discarded to waste through a valve 75, see FIG. 1 and a pump 76 may be used to induce this flow if the pressure in the vessel 50 is subatmospheric. Preferably however this oily waste material is further processed to recover valuable components therefrom. By opening a valve 77 all or a portion of this oily waste material can be pumped into the pipe 13 and mixed with the crude oil before the latter reaches the desalter 12. In the desalter the oily waste material can be largely separated into an oil component which will exit through pipe 18 with the desalted crude oil and a water component which will exit through the pipe 19 as a part of the oil-contaminated water reaching the clarifier 35.

In some instances the water content of the oily waste material in the pipe 65 is sufficiently low to permit all or a portion of the oily waste material to be delivered directly to the refinery equipment. In this event opening of a valve 78 will permit return of a portion or all of the oily waste material to the pipe 23 which feeds the refinery equipment. In the latter the oily waste material can be broken down into products exiting with the normal products in product lines $a$, $b$, $c$, or $d$.

In similar manner, the separated gas is withdrawn from the gas zone 56 through a pipe 80 with the flow being assisted by an aspirator or pump 81 if the interior of the vessel 50 is at subatmospheric pressure. This gas can be discharged to waste by opening a valve 83, FIG. 1, but is desirably returned to the refinery gas recovery system 27 by opening a valve 84 which conducts the gas to the pipe 25. This procedure permits recovery of valuable components from the gas and avoids any discharge of the gas into the atmosphere. Atmospheric pollution is eliminated by the desirable recycle of the gas to the refinery gas recovery system 27.

Some oil-contaminated waters from one or more desalters or from other sources carry heavier materials that do not readily associate with and be carried upward by the gas particles rising in the body of water 53. These heavier materials may be solids or heavier sludge-forming materials that settle in the water zone 52 to the bottom of the vessel. The settled material is usually in the form of a sludge that accumulates in the bottom of the vessel 50 with little or no tendency to flow along the bottom wall thereof toward the lowest portion of the vessel. This sludge can be periodically washed from the vessel during shutdown of the equipment. In those instances where continuous or intermittent removal thereof is desired without shutdown the lower wall of the vessel may be dished downward to form a longitudinal trough 90, best shown in FIG. 3. Positioned there is a helically bladed screw 92 which rotates in bearing blocks 93, 94 and is turned by a motor 95 to advance the sludge along the trough 90 toward a pipe 96 through which the sludge exits from the vessel. The flow of the sludge can be controlled by a valve 97, FIG. 1, and the flow may be assisted by a pump 98, particularly when subatmospheric pressure conditions are maintained in the vessel 50.

The general operation of the invention can best be described when used in conjunction with conventional refinery equipment shown in FIG. 1. The oil-contaminated water will usually discharge from the desalter 12 at a pressure of about 25–200 p.s.i.g. and a temperature of about 130°–300° F. and will contain in the neighborhood of about 0.02–0.1 percent by volume of oil with a significant amount of gas dissolved in the water and/or the oil. The gas content can be augmented from the sources previously described. Use of a spent gas from the refinery equipment, introduced through the valve 38 is particularly desirable. The total amount of gas in the steam advancing toward the clarifier 35 is not critical and will depend upon the oil content of the oil-contaminated water. It is not essential that all of the gas be dissolved in the water and oil components but best results are obtained if a significant portion of the gas is thus dissolved. The gas-containing stream can be further heated during flow in the pipe 32 as by injecting steam thereinto. The soaker 45 provides residence time for phase equilibrium.

There will usually be some significant reduction in pressure during flow through the valve 33 and/or the openings of the distributor 48, resulting in some of the dissolved gas being released to appear as gas particles in the stream. In any event however there will be discharged into the body of water 53 at a lower level therein a stream of water that carries oil droplets and gas particles. The gas particles will rise in the water and will associate with and carry upward the oil droplets of the stream and the oil droplets existing in the body of water 53. Addition of a suitable chemical, through operation of the pump 41, will assist the joining of a gas particle to an oil droplet. Chemicals of this type are well known in the art. Merely by way of example, the chemical may be a water-soluble alcoholic solution of an alkanol amine such as the amide reaction product of stripped coconut fatty acid and diethanolamine.

As shown in FIG. 2, the resulting gas-oil complexes, here indicated by the numeral 100, will rise to the upper inclined wall 60. This will occur largely in the area of the first section 60a above the water zone 52. As the gas-oil complexes reach the inclined wall they will be guided along its inclined surface to the oily waste zone 54. The gas-oil complexes will predominantly be delivered to one end of the oily waste zone and this action will usually cause some localized buildup in depth of the oily waste material in the left-hand end of the zone. This in turn tends to create a flow of the oily waste material in the zone 54 toward the weir-forming edge 64 of the trough 63. This is one reason why the invention eliminates the necessity of using the mechanical surface skimmers of earlier structures. Because of such localized buildup of the oily waste material the interface 58 will not always be exactly horizontal: Instead it will usually slope downward toward the edge 64.

In the oily waste zone 54 the gas will separate and rise to join the body of gas 57 in the gas zone 56. The oily waste material remaining in the layer 55 thereof will be composed largely of oil, sometimes with minor amounts of water, chemical agent or residual unseparated gas therein. As the average depth of the layer 55 increases, the top portion thereof will discharge over the weir formed by the upper edge 64 and will drop into the through 63 from which it is continuously removed through the pipe 65. The material thus withdrawn is preferably returned to the desalter 12, to some other treater, or directly to the refining equipment 22. In all such instances it will join the oil stream being refined. Likewise the separated gas is desirably recycled from the gas zone 56 to the refinery gas recovery system 27, as previously described. The now-clarified water will discharge through the pipe 70 and will present no disposal problem.

It is an essential feature of the invention that the upward sweeping of the oil droplets by the gas particles and the later separation of the gas should occur in a space closed from the atmosphere. This avoids atmospheric pollution and makes it possible to employ a completely closed system in which materials separating in the vessel 50 can be returned or recycled to other portions of the equipment for recovery of valuable products, all while such materials are out of contact with the atmosphere and thus cannot impart pollutants thereto.

The use of a closed vessel 50 is desirable also in permitting clarification of the water at pressures other than atmospheric. The ability to control the pressure and temperature at which clarification takes place is important in obtaining results in clarifying the water. The pressure in the vessel 50 can be subatmospheric, atmospheric or superatmospheric. If at or below atmospheric, pumps can be used to withdraw the components, while if the pressure in the vessel 50 is superatmospheric it is possible to use simple valves to control the effluent components. Pressures in the vessel 50 may range from about −10 p.s.i.g. to as high as 300 p.s.i.g. in practice. Temperatures therein can be as desired but will usually be of the order of about 60°–300° F. Vapors separating from the oil or water in the clarifier at the higher temperatures and/or lower pressures therein are usually helpful to the clarifying process and offer no disadvantage as they can be returned to the refinery gas recovery system 27 for recovery of valuable products therefrom.

The upper inclined wall 60 that guides the oil-gas complexes to the oily waste zone 54 and eliminates the need for mechanical surface skimmers need not extend above and form the boundaries of all of the zone 52, 54, and 56. An inclined wall defining the top of the gas zone 56 is not critical and a horizontal or other wall can be here used. However it is always necessary to use such an inclined wall in the section 60a above the water zone 52 to guide the rising oil-gas complexes. It is preferable also to use such an inclined wall in the section 60b that bounds the oily waste zone 54. It is effective and economical to clarify the water in an inclined cylindrical vessel but it should be understood that vessels of other shape and attitude can be used so long as they provide the sloping or inclined surface needed to receive and guide the oil-gas complexes to the desired higher elevations where the gas can separate.

Various other changes and modifications will be evident to those skilled in the art from the description herein of the invention in its preferred embodiments and do not depart from the spirit of the invention.

I claim:

1. A clarifier for oil-contaminated water from a desalter, treater, settler or other source, said clarifier including in combination:

a horizontally elongated vessel providing a separating chamber closed from the atmosphere, said separating chamber providing a water zone containing a body of water having dispersed oil droplets therein, an oily waste zone above said water zone, and a gas zone above said oily waste zone, oily waste material in said oily waste zone contacting a body of gas in said gas zone along an interface, said vessel providing an upper inclined wall forming the upper boundary of said water zone and contacting the water therein;

means for delivering to said water zone at a position below said inclined wall (a) the oil-contaminated water to be clarified and (b) a gas, said gas forming gas particles rising in the water zone to associate with said dispersed oil droplets therein to carry these oil droplets upward to said inclined wall, the inclination of said wall being sufficient to guide the gas particles and associated oil droplets therealong to said oily waste zone;

means for removing oily waste material from said layer thereof, said last-named means including a first effluent pipe means removing said oily waste material from said vessel;

a second effluent pipe means withdrawing gas from said gas zone; and a third effluent pipe means withdrawing clarified water from said water zone.

2. A clarifier as defined in claim 1 in which said means for removing said oily waste material includes a trough in said separating chamber extending transverse to said vessel, said trough having a first upper edge forming a weir over which said oily waste material flows in moving from its zone into said trough, said trough providing a baffle extending into said gas zone and terminating in a second upper edge at an elevation above said first edge, there being a space within said vessel beyond said baffle, said first effluent pipe means removing oily waste material from the vessel being a pipe means communicating with a lower portion of the interior of said trough.

3. A clarifier as defined in claim 2 in which said space is between said baffle and an exit end of said vessel, said third effluent pipe means opening on said space to withdraw the clarified water therefrom.

4. A clarifier as defined in claim 1 including means for restricting the flow through each of said effluent pipe means to maintain a superatmospheric pressure throughout the separating chamber of said vessel, said means for delivering the oil-contaminated water and the gas to said water zone including means for pressurizing streams of such water and such gas to a pressure higher than said superatmospheric pressure, means for mingling the pressured streams of water and gas and producing a mingled stream under pressure, and an influent pipe means receiving such mingled stream and communicating with said water zone, said influent pipe means having a restriction reducing the pressure on said mingled stream to said superatmospheric pressure existing in said separating chamber.

5. A clarifier as defined in claim 1 including a pump in each of said effluent pipe means acting to maintain the pressure in said separating chamber below atmospheric pressure.

6. A clarifier as defined in claim 1 in which said horizontally elongated vessel has a central axis inclined upward from an entrance end to an exit end thereof, the upper interior of said separating chamber being closed by a top wall of said vessel, said top wall constituting said inclined wall and providing an inclined surface contacting the water in said water zone and the oily waste material in the oily waste zone.

7. A clarifier as defined in claim 6 in which said top wall has first, second and third sections having inclined surfaces in alignment with each other, said inclined surface of said first section being above said means for delivering said oil-contaminated water to said water zone, said inclined surface of said second section contacting the oily waste material in said oily waste zone, said inclined surface of said third section forming the upper boundary of said gas zone.

8. A clarifier as defined in claim 7 in which said vessel is an inclined cylindrical vessel closed at its entrance and exit ends by heads, the top of said cylindrical vessel forming said inclined top wall and providing said first, second and third sections thereof, said gas zone being generally triangular in vertical section and being bounded by said third section and the head at the exit end of said vessel.

9. A clarifier as defined in claim 6 in which the bottom of said vessel has a bottom wall that is dished downward to form a longitudinal trough, and including a conveyor means in said longitudinal trough receiving solids settling toward the bottom of said vessel and conducting same from said vessel.

10. A combination as defined in claim 1 in which the oil-contaminated water is produced by a desalter, said desalter having an emulsion inlet pipe, said first effluent pipe means being connected to said emulsion inlet pipe to deliver thereto at least a portion of said oily waste material removed from said vessel through such first effluent pipe means.

11. A combination as defined in claim 10 including a mixing device in said emulsion inlet pipe beyond the point where said oily waste material is delivered thereto, said mixing device mixing emulsion in said emulsion inlet pipe with said oily waste material.

12. A combination as defined in claim 11 including also means for delivering another liquid to said emulsion inlet pipe at a position ahead of said mixing device, said mixing device mixing said emulsion, said oily waste material and said other liquid together before introduction into said desalter.

13. A clarifier as defined in claim 1 in which said means for delivering said oil-contaminated water and said gas to said vessel includes a connecting pipe receiving said oil-contaminated water under pressure and communicating with said water zone at said position below said inclined wall, a side pipe delivering said gas to said connecting pipe under pressure sufficient to dissolve some of said gas in said oil-contaminated water, and a restriction in said connecting pipe converting at least some of the gas dissolved in said oil-contaminated water into discrete gas particles forming at least a part of said gas particles rising in said water zone.

14. A clarifier as defined in claim 13 including a second side pipe delivering steam to said connecting pipe.

15. A clarifier as defined in claim 13 including another side pipe delivering a chemical agent under pressure to said connecting pipe.

16. A clarifier as defined in claim 1 operatively connected to an oil refinery producing petroleum products including a gas that is delivered to a gas recovery system, the oil to be refined being delivered to the refinery from a desalter, said oil-contaminated water being bled from said desalter, the gas delivered to said water zone being at least a portion of said gas produced by said refinery.

17. A combination as defined in claim 16 including means for delivering to said gas recovery system at least a portion of the gas withdrawn from said gas zone through said second effluent pipe means.

18. A combination as defined in claim 16 including means for delivering to said oil to be refined at a position between said desalter and said refinery at least a portion of said oily waste material withdrawn from said vessel through said first effluent pipe means.

* * * * *

UNITED STATES PATENT OFFICE
CERTIFICATE OF CORRECTION

Patent No. 3,623,608            Dated November 30, 1971

Inventor(s) Logan C. Waterman

It is certified that error appears in the above-identified patent and that said Letters Patent are hereby corrected as shown below:

Column 5, line 52, before "advancing" "steam" should be --stream--.

Column 6, line 45 after "obtaining" --better-- has been omitted.

Claim 11, line 2, after "said emulsion" --inlet-- has been omitted.

Signed and sealed this 9th day of May 1972.

(SEAL)
Attest:

EDWARD M. FLETCHER, JR.          ROBERT GOTTSCHALK
Attesting Officer                Commissioner of Patents